March 20, 1951 W. J. KEMP 2,546,072
ENDLESS CONVEYER
Filed Sept. 3, 1946 3 Sheets-Sheet 1
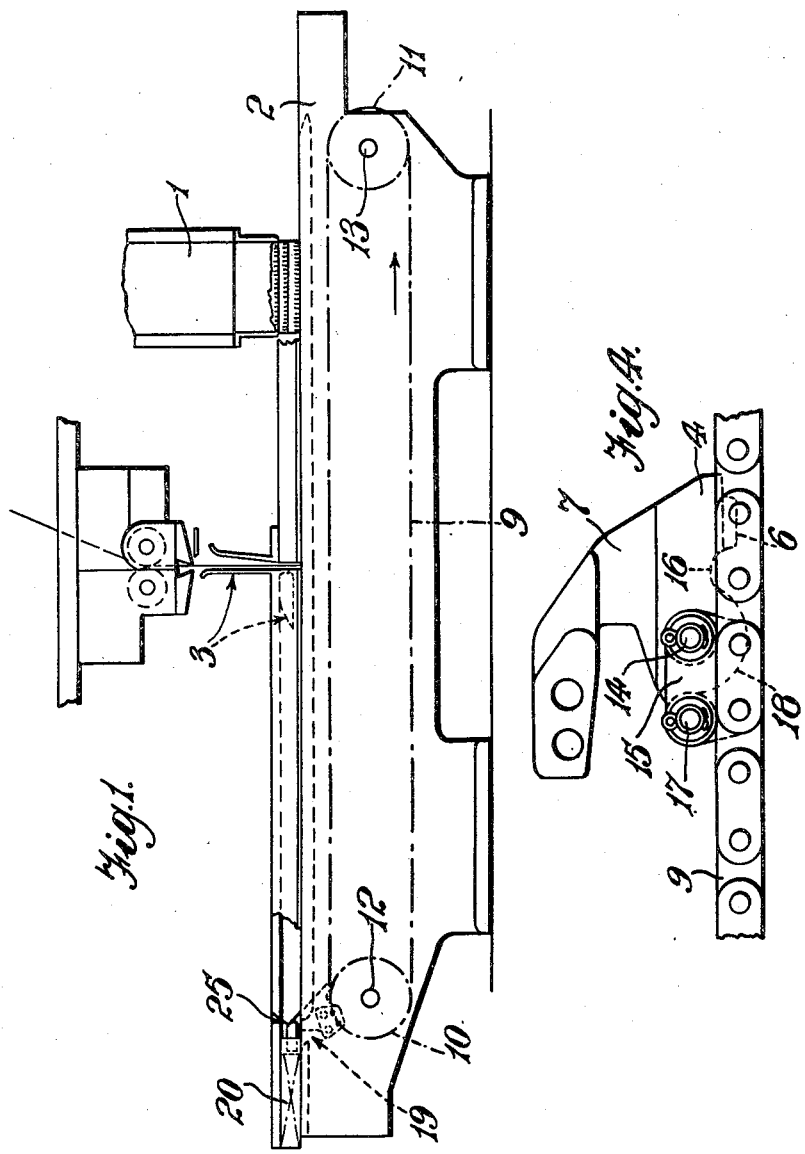
Inventor
William J. Kemp
By Watson, Cole, Grindle & Watson March 20, 1951  W. J. KEMP  2,546,072
ENDLESS CONVEYER
Filed Sept. 3, 1946  3 Sheets-Sheet 2
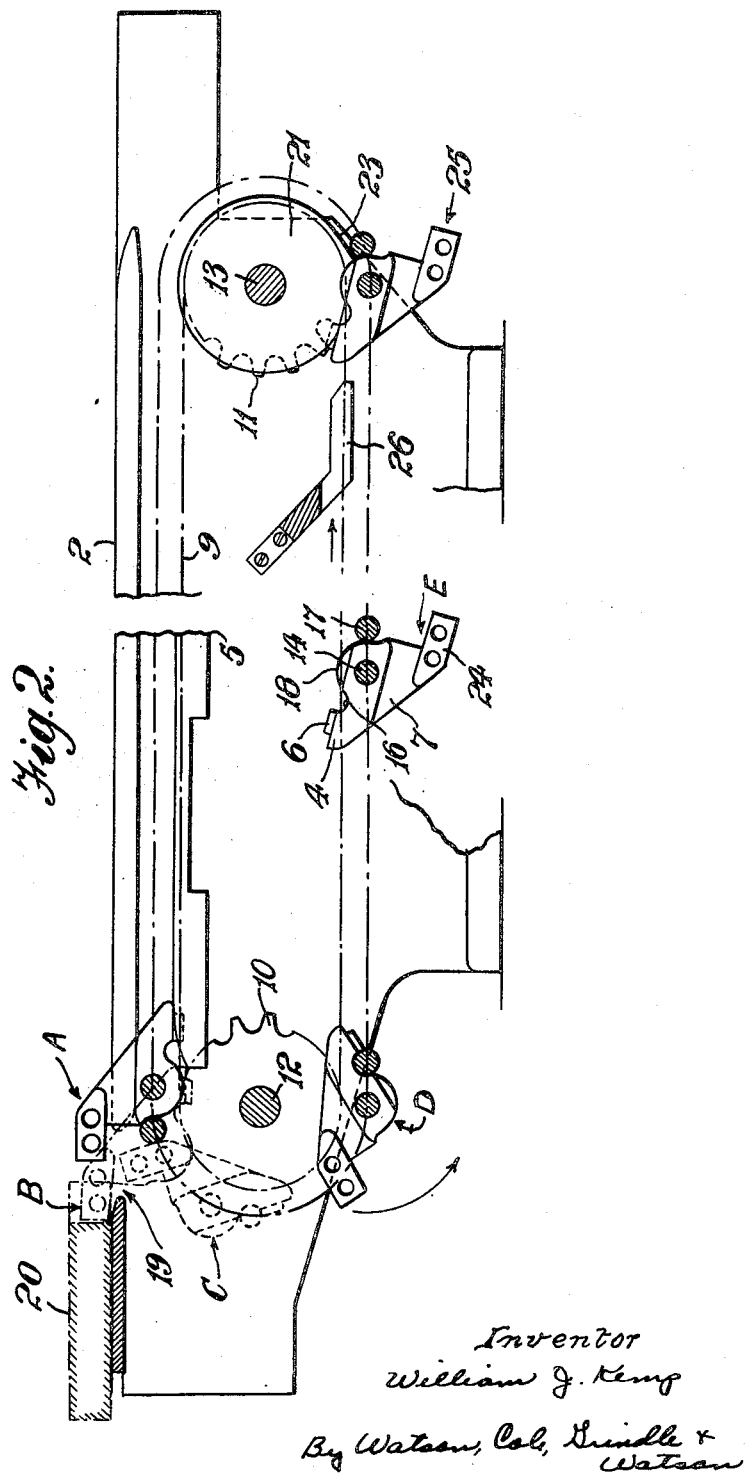
Inventor
William J. Kemp
By Watson, Cole, Grindle & Watson

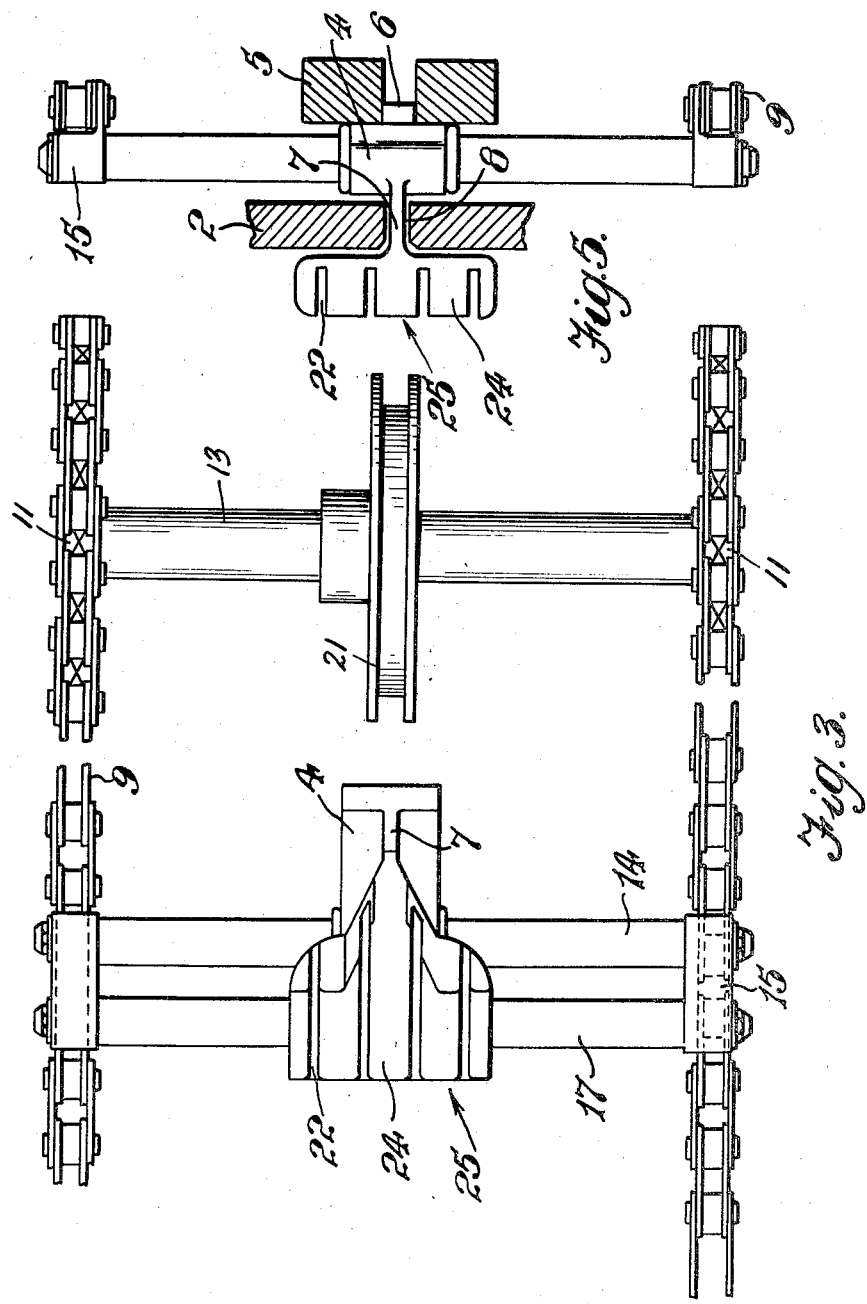

Patented Mar. 20, 1951

2,546,072

UNITED STATES PATENT OFFICE 2,546,072

ENDLESS CONVEYER

William Joseph Kemp, Deptford, London, England, assignor to Molins Machine Company, Limited, London, England Application September 3, 1946, Serial No. 694,577
In Great Britain September 13, 1945

4 Claims. (Cl. 198—170)

This invention concerns improvements in or relating to endless conveyors of the tip-back type. Such conveyors are, for example used in packing machines, and comprise a pusher piece to move an article or batch of articles (e. g. a batch of cigarettes) along a machine bed during which movement various operations are performed on the article and at the end of the movement the pusher piece disappears beneath the bed and leaves the article at rest. When the article is wrapped in some kind of wrapping material during its movement along the bed, it is necessary to swing the pusher backwards as it is about to pass beneath the bed in order to avoid spoiling the arrangement of the wrapper. This operation is usually known as "tipping-back" the conveyor.

Many arrangements have been devised for this purpose all more or less complex and expensive and often noisy in operation.

An object of the present invention is to provide an endless conveyor of the kind referred to in which the pushers are caused to tip back without elaborate control mechanism at the tipping position and on their return run beneath the bed of the machine are controlled as to position without the use of the usual guide rails and are controlled in their movement back on to the surface of the bed by a simple wheel. The resulting conveyor is quiet, efficient and cheap.

According to the present invention there is provided a conveyor of the tip-back type comprising endless flexible conveyor-means (e. g. conveyor chains), a pusher piece rotatable on a spindle carried by said means, said pusher piece being adapted to fall away or tip back from an article when free to do so, another spindle (e. g. mounted in advance of the pusher spindle) movable with the endless flexible conveyor-means and adapted to form a stop to arrest the backward swinging movement of the falling pusher piece during the tipping back and to control the pusher piece until the latter swings in the reverse direction by gravity and thereafter hangs freely on the pusher spindle during its return run. The flexible conveyor-means may comprise chains running on two spaced sprocket wheels which are mounted on spindles comprising a wheel on the rear conveyor sprocket spindle, the rim of said wheel being adapted to engage a pusher piece to control its return movement to the bed of the machine. The wheel may comprise a hump, a flank of which engages firmly with a part of the pusher piece and prevents any slackness in the parts during the return to the bed so as to avoid any mis-alignment with other parts of the machine during said movement. Top rails may be provided to assist in guiding the pusher piece and holding it rigid during its movement along the upper surface of the bed.

One way of carrying the invention into effect will be described with reference to the accompanying drawings which show a conveyor suitable for use on a packing machine adapted to wrap batches of cigarettes in metal foil.

In the drawings—

Figure 1 is a small scale diagram of a packing machine.

Figure 2 is a broken view drawn to a larger scale showing details of the conveyor shown in Figure 1.

Figures 3, 4 and 5 show a plan and front and side elevations respectively of a pusher piece mounted on the conveyor.

Referring to Figure 1 the cigarettes are fed from a hopper 1 on to the upper surface of the bed 2 in the usual manner and carried along it by a pusher piece 25 through devices 3 which wrap the batch in a sheet of foil and form the latter into an open-ended cup or into a U-shaped strip about the batch. Referring now to Figures 2 to 5 the pusher piece 25 comprises a metal block 4 which runs beneath the bed 2 and is supported on a pair of guide rails 5 fixed beneath the bed, the block having a tongue or slide 6 which runs in a space between the rails and controls the pusher piece against lateral movement. A thin upstanding piece or stem 7 projects from the block through a narrow slot 8 in the bed and to this is attached the pusher body 24 which engages and moves a batch along the bed. The pusher piece is attached to an endless flexible element comprising a pair of endless chains 9, one arranged at each side of the bed and supported at the ends of the conveyor runs by sprocket wheels 10 and 11 rotatable on spindles 12 and 13 journalled in the bed. The attachment of the pusher piece to the chains is by means of a spindle 14 which passes through the block 4 of the pusher piece and on which the pusher piece is rotatable. The ends of the pusher spindle are fixed in small plates 15 which are fixed to the sides of the chains (e. g. clipped to the pins of sprocket chains). The lower surface of the pusher block 4 is provided with an arcuate groove 16 positioned a short distance behind the pusher spindle centre (e. g. ½") and the side plates support another spindle 17 sufficiently far in advance of the first spindle for the groove in the pusher block to engage therewith at times and act as a stop as will be explained later. The pusher block is formed to a convex arc 18 of circular form between the groove and the front of the block, the arc being struck about the centre of the pusher spindle. A gap 19 is formed in the bed at the tipping back position in the usual manner.

When the conveyor is working the pusher piece carries a wrapped batch 20 along the bed and delivers it across the gap, the pusher piece being controlled by the rails 5 during this movement. The rails terminate just before the gap 19, and the under surface of the pusher block being no longer supported by the rails, the pusher piece is free to rotate about the pusher spindle 14 if a suitable impulse is given to it.

The pusher piece movements will be better understood by reference to the five positions marked A, B, C, D, E on Figure 2 in conjunction with the following description. In the case of a machine actually engaged in packing cigarettes the impulse is given by the reaction from the batch being moved along by the pusher piece which normally is in position A. The pusher piece therefore tilts backwards from position B or tips back, the movement being assisted by gravity as soon as the pusher piece has tilted backwards far enough to overbalance. If the machine is merely running idle, as is the case during setting or other service operations the tipping back is caused by the bed surface beyond the gap which is engaged by the under surface of the pusher body 24 which slightly overhangs said surface at the tipping back position. The forward conveyor spindle 12 is journalled a short distance (e. g. about 5/8") beyond the ends of the guide rails 5, and thus as tipping back starts, the pusher spindle begins to move around the conveyor spindle centre and carries the pusher piece beneath the bed, position C. The pusher piece rotates on its spindle as aforesaid until the groove 16 in the pusher block engages the stop spindle and the pusher piece stays still relatively to the pusher spindle until the pusher piece begins to travel along the lower run of the conveyor, position D, when it swings over on the pusher spindle in the direction of the arrow at position D by gravity until the pusher piece is hanging downwards as in position E. The stop spindle is then of course out of the groove 16, the arcuate surface of the block having passed by and in contact with the stop spindle during the swinging movement. The pusher piece continues in this position all along the lower run of the conveyor until the rear spindle 13 of the conveyor is reached. On this spindle there is fixed a grooved wheel 21 the groove being of a suitable section to accommodate the tongue 6 on the pusher block and the block engages the rim of the wheel so as to be guided in its return movement on to the upper surface of the bed. It is often the practice to slot the top of the pusher body as at 22, Figures 3 and 5, to clear parts of the cigarette hopper or otherwise to shape it specially and it is therefore desirable to prevent any side movements of the pusher piece during the return movement on to the bed. The wheel may therefore be specially shaped so as to engage the pusher block firmly during the movement. A convenient way of arranging this is to provide a hump 23 on the rim of the wheel, the hump having flat sides leading to the remaining part of the periphery of the wheel which is circular. The flat lower surface of the pusher block 4 engages with and lies closely against one of the flats as shown at the right-hand end of Figure 2 and thus the pusher piece cannot move to any extent relatively to the wheel and is carried up in a substantially fixed path on to the upper surface of the bed.

As the pusher pieces have to run practically without lubrication in order to avoid getting oil on to the articles being packed, it might happen that a pusher piece would fail to execute the turning movement at the beginning of the return run of the conveyor (position D) and would be in danger of jamming beneath the wheel. To prevent this an abutment or shoe 26 may be fixed near the end of the return run so as to engage the pusher piece and positively ensure that the pusher piece is turned over before it meets the wheel.

What I claim as my invention and desire to secure by Letters Patent is:

1. A conveyor of the tip-back type comprising a machine bed on which articles are supported and conveyed, a pair of parallel endless conveyor chains, each having an upper operative run extending parallel with and in contiguous relation to said bed and a lower return run, sprocket gears journalled on said bed and supporting said chains, a spindle carried by and extending between said chains, a pusher piece mounted on said spindle for rotation about the spindle axis, guide means supported by and extending lengthwise of said bed, said guide means being positioned to engage with said pusher piece over a substantial portion of its travel with the operative runs to retain the pusher piece in an operative position in which a portion of said pusher piece extends above said bed to engage and convey articles along said bed, said pusher piece being in unstable equilibrium while in such operative position, said guide means having a length such that engagement of said guide means with said pusher piece terminates as said pusher piece approaches the end of its travel with said operative runs, whereby said pusher piece is rotated by gravity and the pressure exerted by the article away from the article being conveyed to a position below the level of said article, a second spindle carried by and extending between said chains for engaging and limiting rotation of said pusher piece to its inoperative position, said pusher piece being rotated in the reverse direction by gravity on approaching the return runs to a position of stable equilibrium which it occupies in travelling with the return runs.

2. A conveyor as claimed in claim 1 comprising a wheel journalled on the axis of the conveyor sprocket gears around which the pusher piece moves at the end of the return runs and disposed in the path of movement of the pusher piece, the rim of said wheel being grooved to engage a tongue on the pusher piece to restrict sidewise movement of the pusher piece during its return movement to the surface of the machine bed.

3. A conveyor as claimed in claim 2 in which the wheel on the axis of the conveyor sprocket gears is provided with a protruding flat surface on its rim which engages a flat surface formed on the pusher piece to hold the pusher piece in a definite position relatively to the conveyor chains during its return movement to the surface of the machine bed.

4. A conveyor as claimed in claim 1 comprising an abutment supported on said bed, located adjacent the return runs, and positioned to engage a pusher piece which has failed to swing in said reverse direction and to turn it into the correct position before it reaches the conveyor sprockets at the end of the return runs.

WILLIAM JOSEPH KEMP.

REFERENCES CITED

The following references are of record in the file of this patent:

UNITED STATES PATENTS

| Number | Name | Date |
|---|---|---|
| 867,995 | Musser | Oct. 15, 1907 |
| 1,971,875 | Pert | Aug. 28, 1934 |
| 2,253,367 | Di Prima | Aug. 19, 1941 |